United States Patent
Herrmann et al.

(10) Patent No.: US 6,736,427 B2
(45) Date of Patent: May 18, 2004

(54) SAFETY BELT APPARATUS

(75) Inventors: Thomas Herrmann, Illerkirchberg (DE); Richard Frank, Elchingen (DE); Thomas Schwer, Ulm (DE); Vadim Ruge, Burgrieden (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 10/054,915

(22) Filed: Jan. 25, 2002

(65) Prior Publication Data
US 2002/0096872 A1 Jul. 25, 2002

(30) Foreign Application Priority Data
Jan. 25, 2001 (DE) .......................................... 101 03 319

(51) Int. Cl.7 ............................................. B60R 22/28
(52) U.S. Cl. ..................................................... 280/805
(58) Field of Search ............................... 280/805, 804, 280/806, 807; 297/464, 468, 469, 470, 471, 472

(56) References Cited

U.S. PATENT DOCUMENTS

| | | | |
|---|---|---|---|
| 3,680,913 A | 8/1972 | Seybold | ..................... 297/386 |
| 4,027,905 A | * 6/1977 | Shimogawa et al. | ......... 297/472 |
| 5,544,918 A | * 8/1996 | Fleming et al. | ............. 280/805 |
| 5,700,034 A | * 12/1997 | Lane, Jr. | ..................... 280/805 |
| 6,394,241 B1 | * 5/2002 | Desjardins et al. | ......... 188/376 |
| 6,460,890 B2 | * 10/2002 | Dietrich | ................... 280/801.2 |

FOREIGN PATENT DOCUMENTS

| | | |
|---|---|---|
| DE | 198 57 927 | 10/1999 |
| DE | 199 30 156 | 1/2001 |

\* cited by examiner

*Primary Examiner*—Paul N. Dickson
*Assistant Examiner*—Faye M. Fleming
(74) *Attorney, Agent, or Firm*—Foley and Lardner

(57) ABSTRACT

A safety belt apparatus for motor vehicles comprising a safety belt and a deflecting device for the safety belt which is connected to a holder which can be fastened to the vehicle via an absorption unit. The deflecting device being movable in an absorption direction by forces occurring relative to the holder with a pulling movement of the safety belt caused by an accident while overcoming an opposing absorption resistance of the absorption unit. The deflecting device being hindered from making a movement in the absorption direction with forces occurring in normal operation. The absorption unit being changeable in shape by the deflecting device moving in the absorption direction in order to overcome the absorption resistance.

20 Claims, 7 Drawing Sheets

SAFETY BELT APPARATUS

BACKGROUND

The invention relates to a safety belt apparatus for motor vehicles comprising a safety belt and a deflecting device for the safety belt.

Such safety apparatuses are generally known. In the event of an accident, the safety belt apparatus must take up the energy of a vehicle occupant held by the safety belt. It is known for this purpose to integrate a torsion rod or bar into a reel which is deformed by a pulling movement of the belt induced by an accident when the reel is blocked. This kind of energy absorption requires a belt reel especially designed for this.

It is an underlying object of the invention to provide a safety belt apparatus which ensures an optimum absorption of the energy generated by the vehicle occupant in the event of an accident with the simplest possible design and a secure and reliable functioning, and in particular without impairing the function of other components of the safety belt apparatus.

SUMMARY OF THE INVENTION

According to the present invention, a safety belt apparatus is provided. The apparatus includes a safety belt and a deflecting device. The deflecting device being connected via an absorption unit to a holder which can be fastened to the vehicle, with the deflecting device being movable in an absorption direction by forces occurring relative to the holder with a pulling movement of the safety belt caused by an accident while overcoming an apposing absorption resistance of the absorption unit, but being hindered from making a movement in the absorption direction with forces occurring in normal operation, and with the absorption unit being changeable in shape by the deflecting device moving in the absorption direction in order to overcome the absorption resistance.

In accordance with the invention, a movement of the deflecting device is used for the energy absorption. For this purpose, an absorption unit is provided between the holder fixed to the vehicle and the deflecting device cooperating with the safety belt which is formed such that it prevents a movement of the deflecting device in normal operation, while allowing a movement of the deflecting device in the absorption direction with forces such as occur in an accident and which act on the deflecting device via the safety belt. The absorption unit in accordance with the invention allows the kinetic energy of the vehicle occupant in the event of an accident to be absorbed by a change in shape of the absorption unit during the movement of the deflecting device. This change in shape can generally take place in any manner, for example by material deformation, material removal, material destruction or another kind of material processing. Combinations of different material processing kinds are also possible in accordance with the invention.

The absorption device is preferably directed vertically downwardly. The deflecting device can move parallel to the vehicle side panel and parallel to a belt section extending between a belt reel and the deflecting device during the absorption of energy. It is furthermore preferably provided that the change in shape of the absorption unit is irreversible. Furthermore, the absorption unit can be deformable at least sectionally, in particular plastically, for the change in shape. In accordance with a further preferred embodiment of the invention, it is provided that the absorption unit comprises at least a part of the holder.

It is proposed in a practical embodiment of the invention that the absorption unit comprises at least one bending element, in particular a strip-like or rod-like bending element, which preferably extends approximately parallel to the absorption direction between the deflecting device and the holder.

The upper end of the bending element can be fastened to the deflecting device and the lower end to the holder so that the upper end is moved in the direction of the lower end by the movement of the deflecting device and deformation work is carried out at the bending element in this way. It is preferred if two bending elements are provided which extend parallel to one another and which are arranged at opposite sides of the safety belt.

An alternative or additional possibility for the energy absorption consists, in accordance with a further embodiment of the invention, of a connection between at least two part sections of the absorption unit which is present during normal operation being separable for the change in shape of the absorption unit. One of the part sections may be formed by a base part which can be a component of the holder.

The separation of the connection, which prevents a movement of the deflecting device in the absorption direction in normal operation, can be made in accordance with a further embodiment of the invention by an absorption section of the absorption unit being able to be torn off or out of a base part or the holder.

It is furthermore possible in accordance with the invention for an absorption section of the absorption unit to be simultaneously deformable and separable from a base part or the holder.

A further embodiment of the invention proposes that the change in shape of the absorption unit is effected by material removal. The material removal can take place, for example, by chip forming machining.

A preferred embodiment of the invention consists of the absorption unit comprising at least one recess which can be expanded for the change in shape of the absorption unit. The recess can be formed in a slit-like manner and extend parallel to the absorption direction. In accordance with the invention, the expansion of the recess can be carried out in that material bounding the recess is deformed and/or removed. An engaging section of the deflecting device or a carrier of the deflecting device serving to hold a deflection roller can engage into the recess, with said engaging section consisting of a material whose hardness is greater than that of the material bounding the recess.

The preferred material for the (s) of the absorption unit changeable in shape is steel.

The deflecting device is preferably guided at the holder, in particular parallel to the absorption direction. A defined movement of the deflecting unit is ensured in this manner despite the forces to be overcome.

Moreover, in accordance with a preferred embodiment, it is provided that the deflecting device comprises at least one deflection roller. The deflection roller can be supported at a carrier cooperating with the absorption unit.

A preferred embodiment of the invention further proposes providing a deflecting means which cooperates with the safety belt between the deflecting device and a vehicle occupant such that the safety belt extends at least approximately parallel to the absorption direction between the deflecting device and the deflecting means. The deflecting means hereby provides an optimal guiding of the forces occurring in the event of an accident into the deflecting unit via the safety belt.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
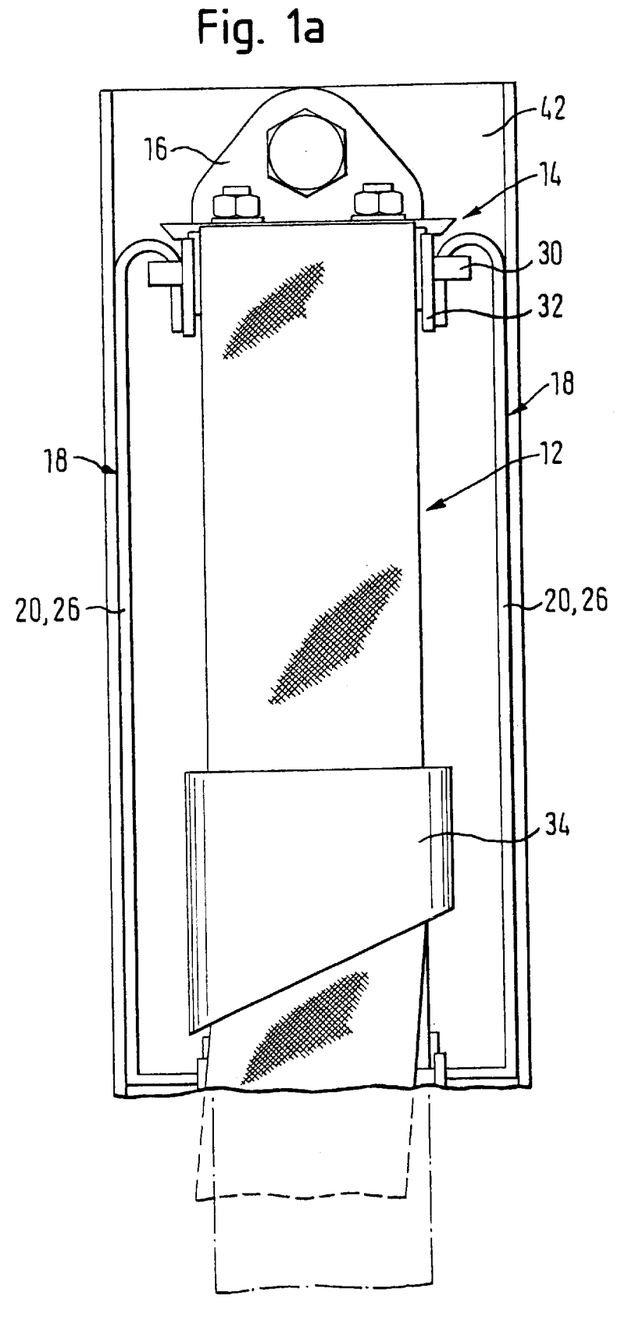
FIG. 1a is a front plan view of a safety belt apparatus according to the present invention.
Figure 1B:
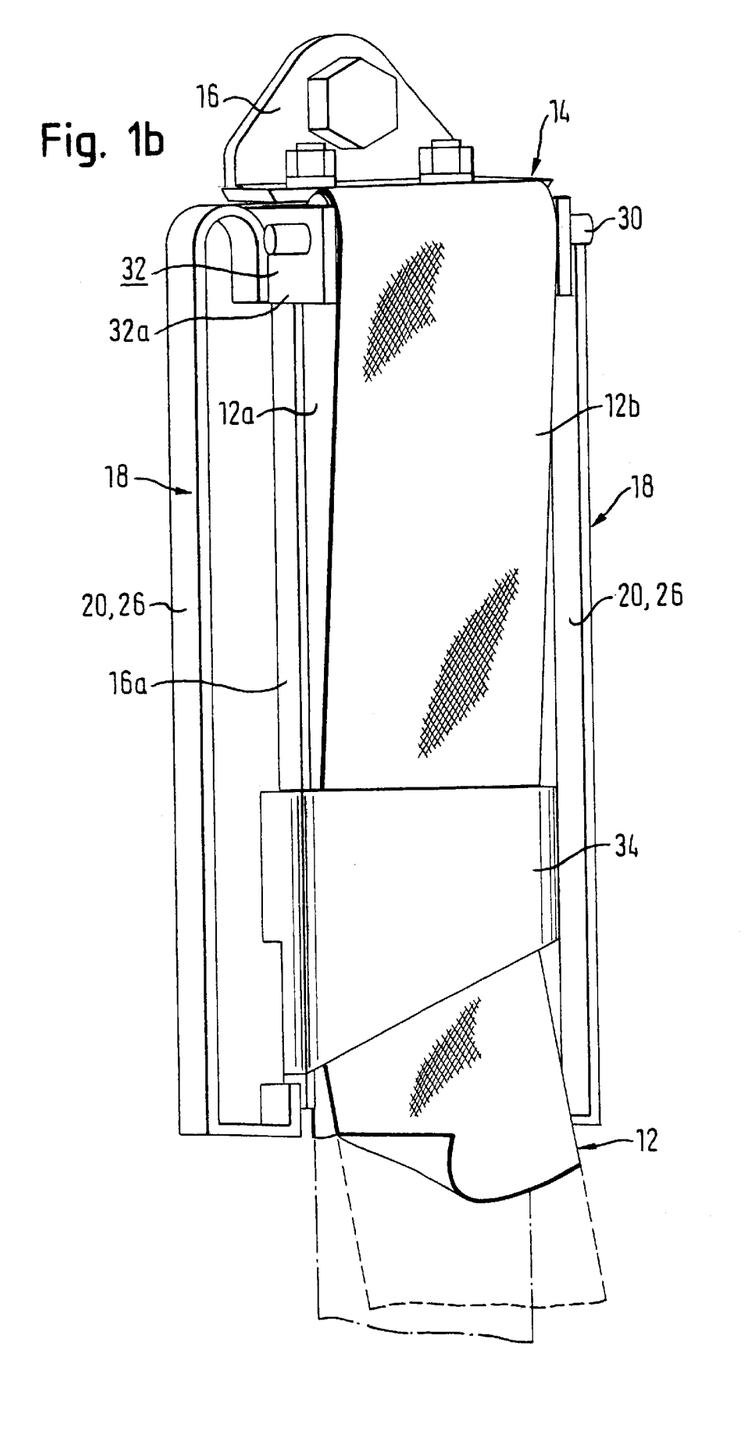
FIG. 1b is a schematic view of the safety belt apparatus of FIG. 1a as seen from the front right side.
Figure 1C:
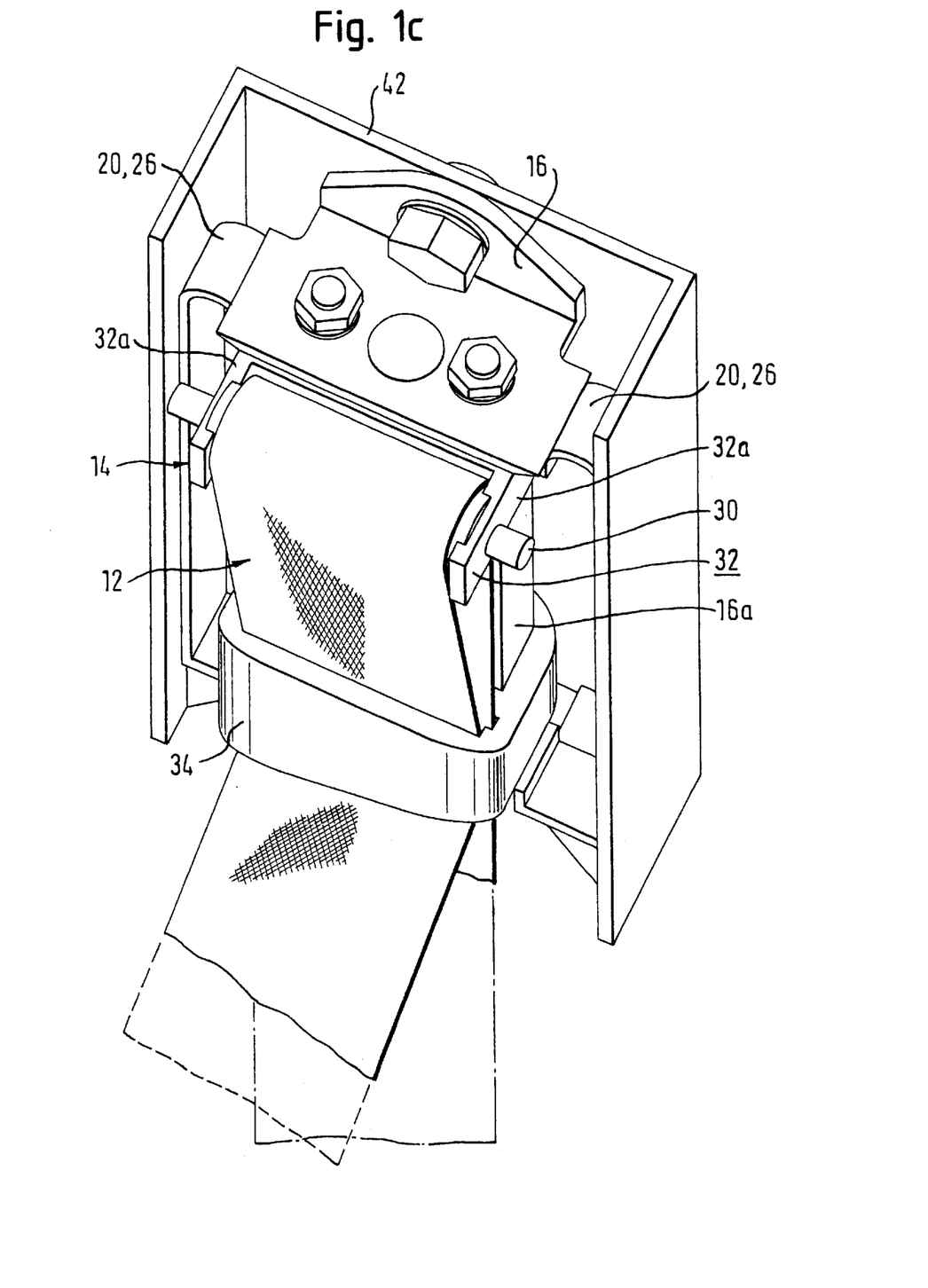
FIG. 1c is a schematic view of the safety belt apparatus of FIG. 1a as seen from the top and front of the apparatus.

The safety belt apparatus shown in FIGS. 1a–1c comprises a holder 16 which has a holding section in the upper region for a deflecting device 14. The apparatus may include a belt tensioner fastened to an end of the seat belt. The pretension and associated belt reel are preferably located immediately adjacent to lower end of the apparatus shown in FIGS. 1a–1c. The continuation of a safety belt 12 is schematically indicated in FIGS. 1a–1c and in the other figures by broken lines (section directed to the occupant) or by chain-dotted lines (section directed to a belt reel and pretensioner).

The holder 16 may be fastened to the vehicle 42 or to the vehicle side panel 42, which is only indicated in the figures, in particular in the region of the B or C pillar. It can be seen in particular from FIG. 1c that the holder 16 is preferably connected to a profile section of U-shaped cross-section of the vehicle 42. The holder 16 and deflecting device 14 may serve as an anchor for a shoulder belt, during normal operation.

The deflecting device 14 includes a deflection roller 30 which is pivotably supported in a carrier 32. The safety belt 12 extends upwardly parallel to the holder 16 from a lower belt reel (not shown), is deflected approximately 180° by the deflection roller 30. The belt 12 then extends downwardly approximately parallel to the holder 16 to a deflecting means 34 arranged above the belt tensioner in the shown normal operation state. The belt 12 is then guided to the respective vehicle occupant during vehicle operation. The deflecting means 34, which is preferably fixed to the holder 16 in a vertically adjustable manner, ensures that the two belt sections 12a and 12b, shown in FIG. 1b, extend approximately parallel to one another above the deflecting means 34. As shown in FIGS. 1a–1c, the deflecting means 34 preferably comprises a shroud or collar surrounding both belt sections 12a, 12b.

Two laterally arranged, strip-like bendable elements 20 extend between the carrier 32 of the deflecting device 14 and a lower region of the holder 16 disposed approximately at the height of the belt tensioner. The bending elements 20 each serve as an absorption section 26 of an absorption unit 18 jointly formed by them. The deflecting device 14 or the carrier 32 is connected to the holder 16 via the absorption unit 18. No additional connection, which could counter a vertical movement of the carrier 32 relative to the holder 16 with a relevant resistance, is present between the deflecting device 14 and the holder 16.

The carrier 32 cooperates with the holder 16 to the extent that a vertical movement of the carrier 32 is guided through the holder 16. For this purpose, the carrier 32 has a guide section of which two arms 32a extending perpendicular to the axis of rotation of the deflection roller 30 are shown in FIGS. 1a to 1c. The arms 32a of the guide section grip around a vertical guide rail 16a of the holder 16. The absorption sections 26 are each connected to the arms 32a of the carrier 32 via their upper, U-shaped, inwardly bent ends.

Moreover, the deflecting means 34 is attached to the guide rail 16a of the holder 16, as can be seen in particular from FIG. 1c.

The lower end of each of the bending strips 20 is bent inwardly in a hook-like manner so that the bending strips 20 extend in offset parallel manner to the guide rail 16a. The bending elements 20 are preferably made of metal, in particular of steel.

The strength or flexural strength of the bending strips 20 is selected so that forces acting on the deflecting device 14 via the belt 12 in normal operation cannot bend the strips 20 or can at best bend them only to a negligible degree. The deflecting device 14 is therefore not forced to move downward in normal operation. The absorption unit 18 formed by the strips 20 thus ensures a normal operation of the deflecting device 14.

The absorption unit 18 is designed so that in the event of an accident when the respective vehicle occupant abruptly pulls on the belt 12 due to his momentum and causes the belt reel to lock, the forces which thereby act on the deflecting device 14 via the belt 12 and which are essentially directed vertically downwardly are sufficient to deform the bending elements 20. In the event of an accident, the deflecting device 14 is consequently moved vertically downwardly along the guide rail 16a of the holder 16 while deforming the bending elements 20. The kinetic energy of the vehicle occupant is thus absorbed by the deforming of the bending elements 20. Work is performed at the absorption unit 18 which results in a change in shape of the absorption unit 18 in order to absorb the motion energy of the vehicle occupant in this way.

By a corresponding design of the bending elements 20, it is thus generally possible to absorb energies of any size in a very short path, i.e. by a comparatively short vertical path of the deflecting device 14. The design and function of neither the belt reel nor other components of the safety belt apparatus are impaired by the type of energy absorption provided by the present invention.

Further examples for the energy absorption in accordance with the invention, in which shape changing work is performed at an absorption unit in order to absorb energy, are described below.

Figure 2:
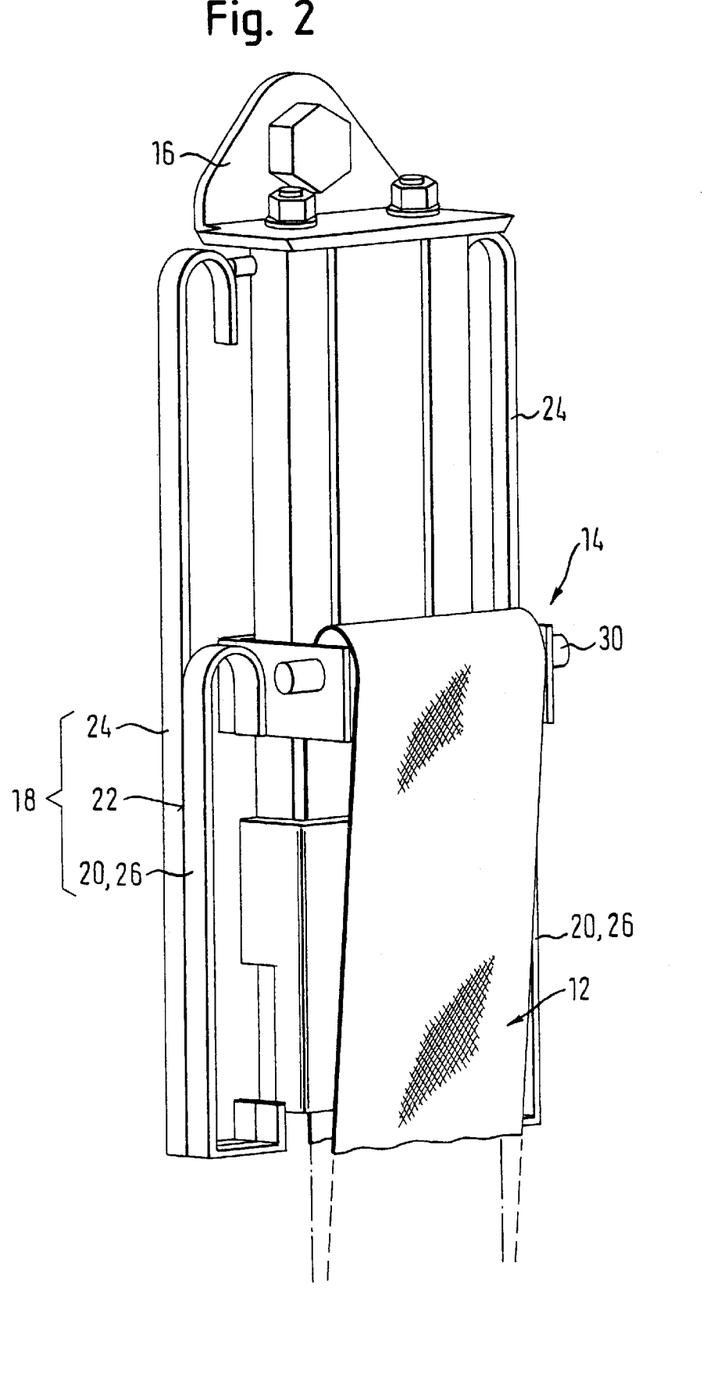
FIG. 2 is a perspective view of a safety belt apparatus of a further embodiment of the invention.

FIG. 2 shows an alternative embodiment of the present invention in which the absorption unit 18 comprises, in addition to bending strips 20 serving as absorption sections 26, two further strip-like elements which are also termed base parts 24 in the following description.

The safety belt apparatus is shown during or at the end of the energy absorption in FIG. 2. The deflecting device 14 is located below its normal position which it assumes during normal operation.

The bending strips 20 and the base strips 24 are fixedly connected to one another along a linear desired separation point 22 during normal operation. The two strips 20, 24 can, for example, be welded together to form the connection. It is also possible to provide a deliberate material weakness in a one-piece starting strip, for example by forming a groove or a notch, in order to manufacture the desired separation point 22.

When the deflecting device 14 is moved downwardly in the event of an accident due to the forces applied via the safety belt 12, then not only a deformation of the bending strips 20 takes place, but energy must also be used in order to separate the connection between the two strips 20, 24 at the desired separation point 22.

Consequently, a combined energy absorption takes place in the absorption unit 18 formed by the two double strips 20, 24, with which the behavior of the absorption unit 18 can be deliberately set in a particularly advantageous manner.

Figure 3A:
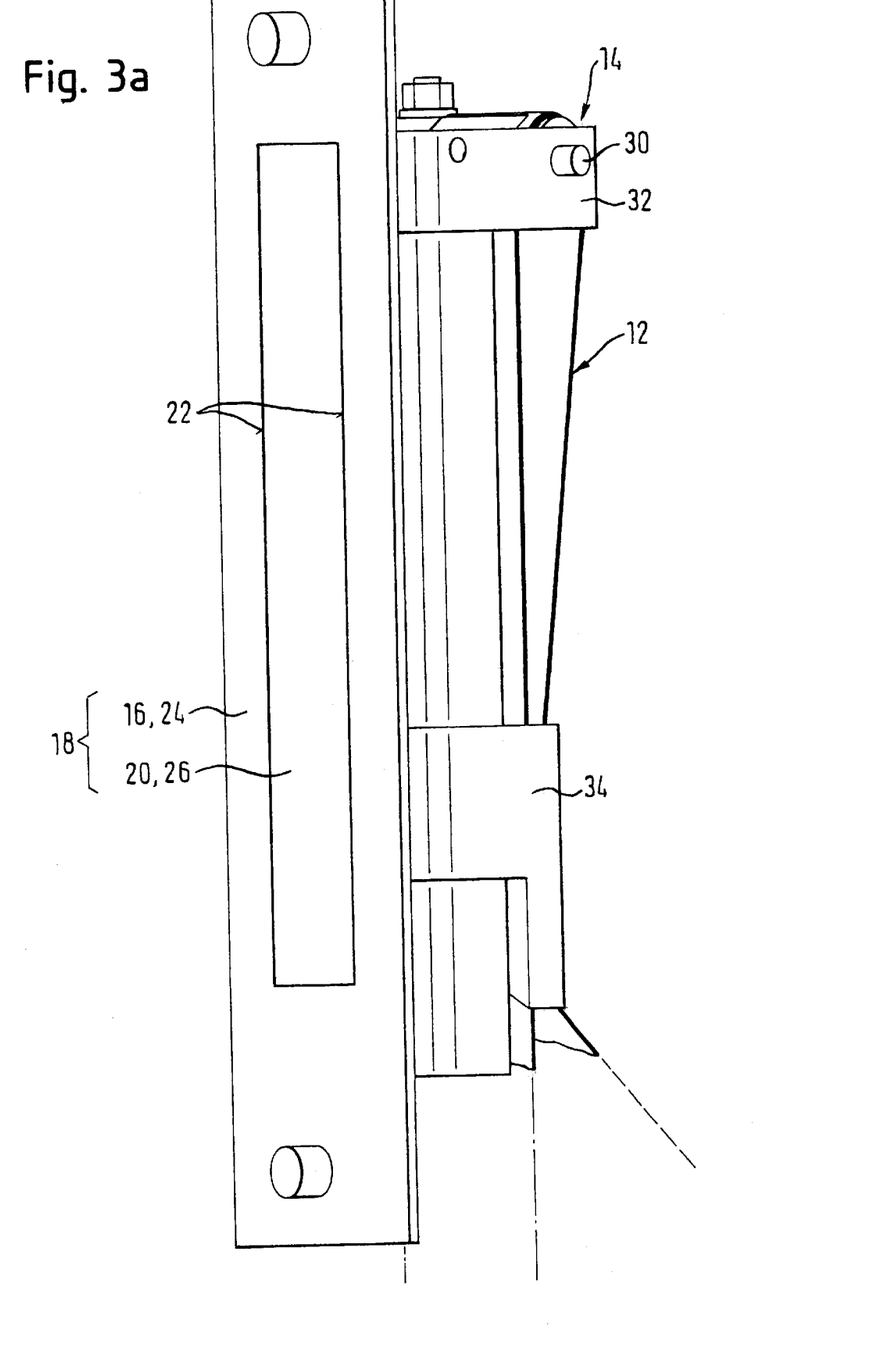
FIG. 3a is a schematic view of a safety belt apparatus according to another embodiment of the present invention as seen from the back right side.
Figure 3B:
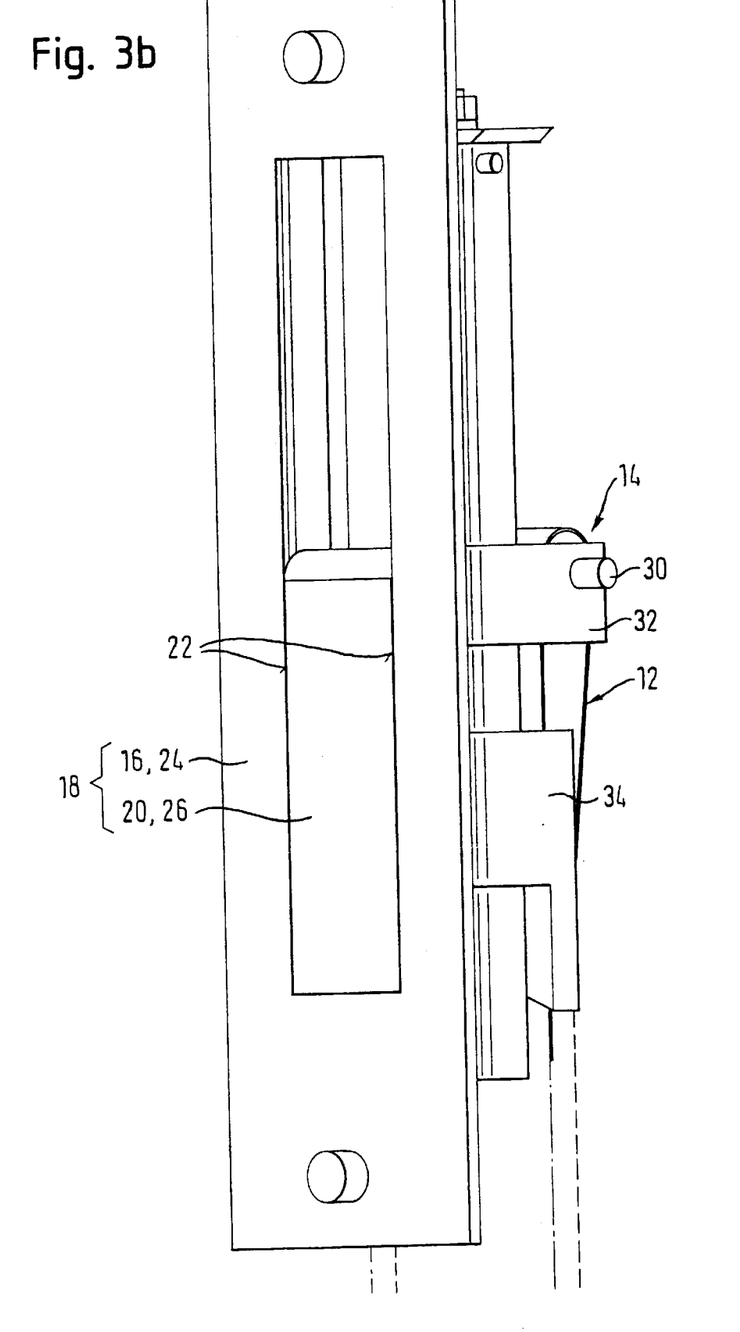
FIG. 3b is a schematic view from the perspective of FIG. 3a after movement of the deflecting device in the absorption direction.

FIGS. 3a and 3b show yet another alternative embodiment of the present invention in which, in turn, a deformation of an absorption section 26 formed as a strip-like bending element 20 and the separation of a connection between the bending strip 20 and a plate-like base part 24, which is solid during the normal operation in accordance with FIG. 3a, takes place simultaneously.

In the embodiment shown, the plate-like base part 24 is a component of the holder 16. It is also possible to provide a part of the vehicle or the vehicle side panel itself as a base part from which the absorption section 26 can be separated for energy absorption and at which a holder for the safety belt apparatus is fastened.

During normal operation, the bending strip 20 is integrated into the base part 24 such that the two parts jointly form a continuous plate. As FIG. 3b shows, when the deflecting device 14 is moved vertically downwardly, in order to absorb energy, the bending strip 20 is, on the one hand, deformed and, on the other hand, pulled or torn off the base part 24 at least in part along the linear desired separation points 22, in similar manner to the lid of a can of sardines.

The separation in accordance with the invention of a fixed connection, which prevents a movement of the deflecting device 14 in the absorption direction, i.e. vertically downwardly in the embodiments shown, with forces occurring in normal operation and which is present between an absorption section 26 and a base part 24 of the absorption unit 18, can be designed such that the absorption section 26 is torn off or out of the base part 24.

Figure 4A:
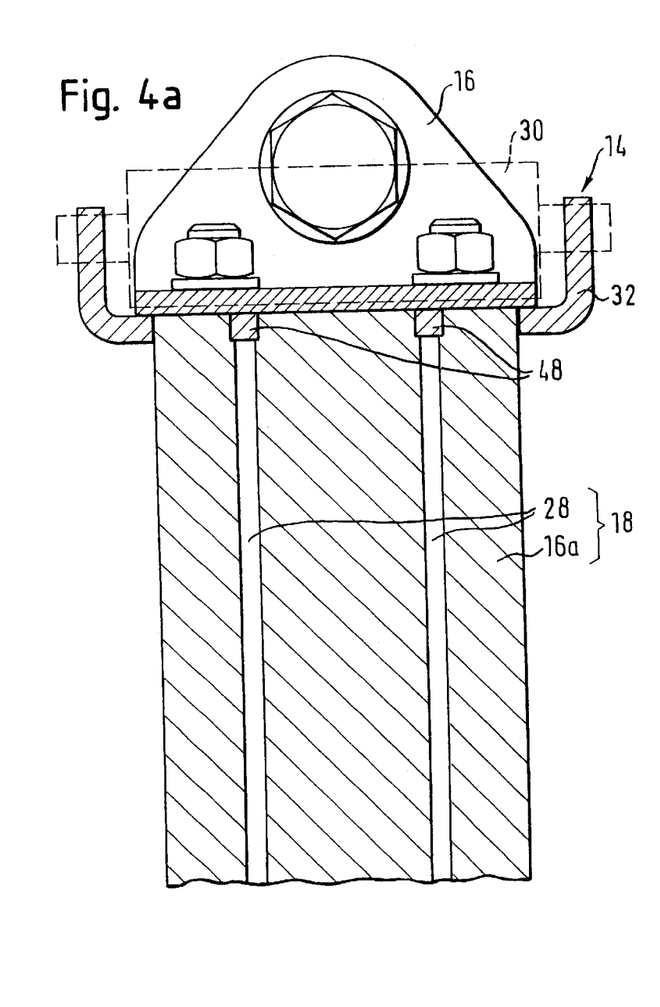
FIG. 4a is a front plan view in partial cross section of a safety belt apparatus according to another embodiment of the present invention.
Figure 4B:
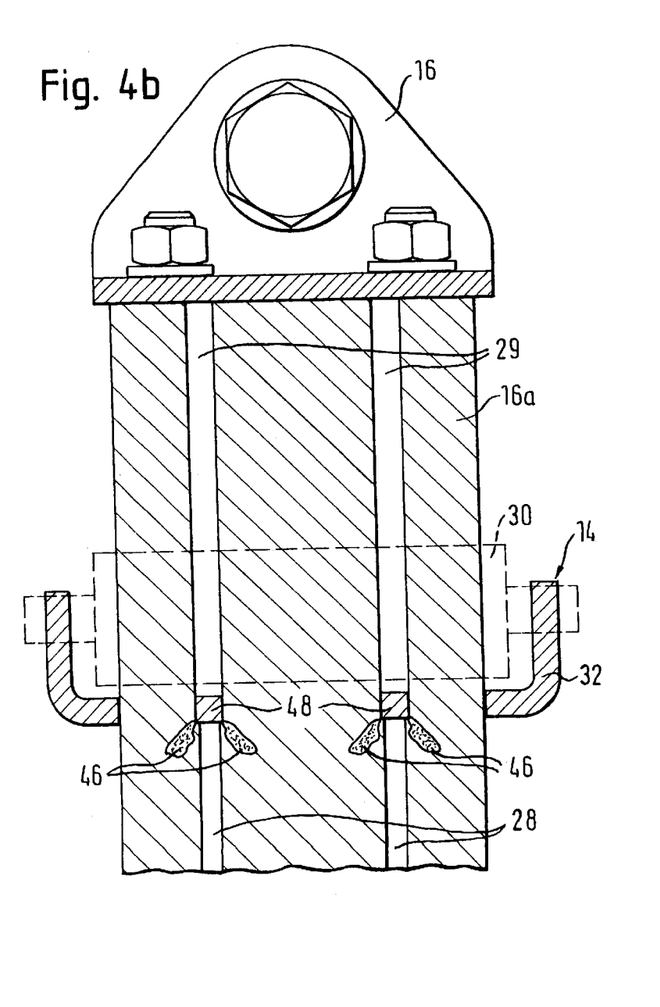
FIG. 4b is a view from the perspective of FIG. 4a after movement of the deflecting device in the absorption direction.

A further embodiment of the present invention is shown in FIGS. 4a and 4b.

The only partly shown safety belt apparatus comprises a holder 16 with a guide rail 16a extending in the vertical direction. The carrier 32 of the deflecting device 14 supports a deflection roller 30 and cooperates with the guide rail 16a in that two engaging sections 48 of the carrier 32 each engage into a slit-like recess 28 formed in the guide rail 16a.

In the normal operating state in accordance with FIG. 4a, the engaging sections 48 are seated in the starting regions of the recesses 28, which are dimensioned in accordance with the outer shape of the engaging sections 48 and thus have a width sufficient for the engaging sections 48. Regions 29 of the slits 28 adjacent hereto are, however, narrower than the engaging sections 48 so that the engaging sections 48 are larger than these slit regions 29 located in front of the engaging sections 48 in the absorption direction.

The absorption unit 18 is formed in this embodiment by the slits 28 and the guide rails 16a or by the material of the guide rail 16a bounding the slits 28.

When, in the event of an accident, the deflecting device 14 is pulled downwardly via the safety belt (not shown), the change in shape of the absorption unit 18 takes place by material removal at the guide rail 16a. The engaging sections 48 are able to cut the slits 28 by material removal along their own width by an appropriate choice of the material for the carrier 32 or at least its engaging sections 48, on the one hand, and for the guide rail 16a or at least its regions bounding the slits 28.

The energy absorption thus takes place by chip forming machining at the guide rail 16a. The removed material 46 is shown in FIG. 4b. Thus, as the engaging sections 48 move downwardly through the slits 28 they remove material from the surrounding portions of the guide rail 16a due to the size difference between the engaging sections 48 and the slots 28.

The absorption properties of the absorption unit 18 can be deliberately set in particular by the number of engaging sections 48 and recesses 28, the size ratios between the engaging sections 48 and the recesses 28 and/or the choice of material for the engaging sections 48 and the regions of the guide rail 16a bounding the recesses 28.

The carrier 32 is simultaneously guided at the guide rail 16a and thus at the holder 16 during the energy absorption by the carrier sections 48 engaging into the recesses 28. This cooperation between the carrier 32 and the guide rail 16a can be designed in an advantageous manner such that no additional measures are required for the guiding of the deflecting device 14 at the holder 16.

In accordance with the invention, the deflecting device could also be directly connected to the vehicle or the vehicle side panel via the absorption unit. The holder within the meaning of the invention is then formed by the means, e.g. in the form of screw connections or weld points, with which the absorption unit is fastened to the vehicle.

The priority document, DE 10103319.2 filed Jan. 25, 2001, is incorporated by reference herein in its entirety.

What is claimed is:

1. A safety belt apparatus for a motor vehicle comprising:
   a safety belt;
   a holder configured to be attached to the vehicle;
   a deflecting device for the safety belt connected to the holder via an absorption unit;
   wherein the deflecting device is configured to move in an absorption direction while overcoming an opposing absorption resistance of the absorption unit, in response to a pulling movement of the safety belt caused by an accident;
   wherein the deflecting device is configured to remain stationary when exposed to forces that occur during normal operation;
   wherein the absorption unit comprises at least one bendable rod or strip that extends in a direction substantially parallel to the absorption direction, and wherein the absorption unit is configured to change in shape in response to movement of the deflecting device in the absorption direction.

2. The safety belt apparatus of claim 1, wherein the absorption direction is an approximately vertical direction.

3. The safety belt apparatus of claim 1, wherein the change in shape of the absorption unit is irreversible.

4. The safety belt apparatus of claim 1, wherein the absorption unit is plastically deformable.

5. The safety belt apparatus of one of claim 1, wherein the absorption unit is at least a part of the holder.

6. The safety belt apparatus of claim 1, wherein a connection, which is present during normal operation, between at least two sections of the absorption unit is separable to effect the change in shape of the absorption unit.

7. The safety belt apparatus of claim 6, wherein the connection is along a line.

8. The safety belt apparatus of claim 1, wherein the absorption unit includes an absorption section configured to be torn off a base part.

9. The safety belt apparatus of claim 1, wherein the holder includes a base part, from which an absorption section of the absorption unit is separable.

10. The safety belt apparatus of claim 1, wherein an absorption section of the absorption unit is deformable and separable from a base part.

11. The safety belt apparatus of claim 10, wherein the base part comprises a plate that extends approximately parallel to the absorption direction.

12. The safety belt apparatus of claim 1, wherein the amount of absorption depends on the position of the deflecting device and increases as the deflecting device moves in the absorption direction.

13. The safety belt apparatus of claim 1, wherein the deflecting device is guided in the holder, in a direction substantially parallel to the absorption direction.

14. The safety belt apparatus of claim 1, wherein the deflecting device comprises at least one deflection roller which is supported by a carrier.

15. The safety belt apparatus of claim 1, further comprising a deflecting means which cooperates with the safety belt between the deflecting device and a vehicle occupant so that the safety belt extends at least approximately parallel to the absorption direction between the deflecting device and the deflecting means.

16. A safety belt apparatus for a motor vehicle comprising:

a safety belt:

a holder configured to be attached to the vehicle;

a deflecting device for the safety belt connected to the holder via an absorption unit:

wherein the deflecting device is configured to move in an absorption direction while overcoming an opposing absorption resistance of the absorption unit, in response to a pulling movement of the safety belt caused by an accident;

wherein the deflecting device is configured to remain stationary when exposed to forces that occur during normal operation;

wherein the absorption unit is configured to change in shape in response to movement of the deflecting device in the absorption direction; and wherein the change in shape of the absorption unit takes place by removing material from the apparatus.

17. A safety belt apparatus for a motor vehicle comprising:

a safety belt;

a holder configured to be attached to the vehicle;

a deflecting device for the safety belt connected to the holder via an absorption unit;

wherein the deflecting device is configured to move in an absorption direction while overcoming an opposing absorption resistance of the absorption unit, in response to a pulling movement of the safety belt caused by an accident;

wherein the deflecting device is configured to remain stationary when exposed to forces that occur during normal operation;

wherein the absorption unit is configured to change in shape in response to movement of the deflecting device in the absorption direction; and wherein the absorption unit has at least one expandable recess.

18. The safety belt apparatus of claim 17, wherein at least one engaging section of the deflecting device engages into the recess wherein the engaging section is larger than an adjacent region of the recess in the absorption direction.

19. The safety belt apparatus of claim 17, wherein the recess is formed in a slit-like manner and extends approximately parallel to the absorption direction.

20. The safety belt apparatus of claim 17, wherein the recess is formed in a plate region of a base part which is part of the holder.

* * * * *

UNITED STATES PATENT AND TRADEMARK OFFICE
CERTIFICATE OF CORRECTION

PATENT NO. : 6,736,427 B2
DATED : May 18, 2004
INVENTOR(S) : Thomas HerrXZ

It is certified that error appears in the above-identified patent and that said Letters Patent is hereby corrected as shown below:

<u>Title page,</u>
Item [73], Assignee, should read -- TAKATA-PETRI (Ulm) GmbH, Ulm, (DE) --

Signed and Sealed this

Tenth Day of August, 2004

JON W. DUDAS
*Acting Director of the United States Patent and Trademark Office*